US009192015B2

(12) United States Patent
Li

(10) Patent No.: US 9,192,015 B2
(45) Date of Patent: Nov. 17, 2015

(54) LED BACKLIGHT DRIVING CIRCUIT AND LCD DEVICE

(71) Applicant: SHENZHEN CHINA STAR OPTOELECTRONICS TECHNOLOGY CO., LTD, Shenzhen (CN)

(72) Inventor: Fei Li, Shenzhen (CN)

(*) Notice: Subject to any disclaimer, the term of this patent is extended or adjusted under 35 U.S.C. 154(b) by 91 days.

(21) Appl. No.: 14/125,582

(22) PCT Filed: Oct. 14, 2013

(86) PCT No.: PCT/CN2013/085173
§ 371 (c)(1),
(2) Date: Dec. 12, 2013

(87) PCT Pub. No.: WO2015/042991
PCT Pub. Date: Apr. 2, 2015

(65) Prior Publication Data
US 2015/0223304 A1    Aug. 6, 2015

(30) Foreign Application Priority Data

Sep. 29, 2013 (CN) .......................... 2013 1 0454231

(51) Int. Cl.
*H05B 37/02* (2006.01)
*H05B 33/08* (2006.01)
*G09G 3/34* (2006.01)

(52) U.S. Cl.
CPC .......... *H05B 33/0887* (2013.01); *G09G 3/3406* (2013.01); *H05B 33/0842* (2013.01); *H05B 37/02* (2013.01); *G09G 2330/045* (2013.01)

(58) Field of Classification Search
USPC ............................ 315/291, 307, 309; 345/102
See application file for complete search history.

(56) References Cited

U.S. PATENT DOCUMENTS

| 7,675,245 B2* | 3/2010 | Szczeszynski et al. ....... 315/291 |
| 8,274,238 B2* | 9/2012 | Szczeszynski et al. ....... 315/247 |
| 2007/0120505 A1 | 5/2007 | Moriyasu et al. |

FOREIGN PATENT DOCUMENTS

| CN | JP2012240492 A | 12/2012 |
| CN | 103001177 A | 3/2013 |
| CN | 103050092 A | 4/2013 |
| CN | 203151838 U | 8/2013 |
| CN | 103281836 A | 9/2013 |

OTHER PUBLICATIONS

Zhang Wei, the International Searching Authority written comments, May 2014, CN.

* cited by examiner

*Primary Examiner* — Thuy Vinh Tran

(57) ABSTRACT

A light emitting diode (LED) backlight driving circuit includes an LED light bar, a voltage conversion unit that drives the LED light bar to light, and a driving chip that controls the voltage conversion unit. The driving chip includes a temperature collecting unit that uses a thermistor contained in the temperature collecting unit, an adjusting device coupled to the temperature collecting unit, and a voltage protection unit coupled to an output end of the voltage conversion unit. When temperature of the thermistor exceeds a preset threshold, the temperature collecting unit outputs a protection signal according to a variation of voltage of the thermistor and the adjusting device controls the voltage conversion unit to output a driving voltage that exceeds an over-voltage protection threshold of the LED backlight driving circuit according to the output protection signal, and the voltage protection unit starts an over-voltage protection function.

18 Claims, 2 Drawing Sheets

LED BACKLIGHT DRIVING CIRCUIT AND LCD DEVICE

TECHNICAL FIELD

The present disclosure relates to the field of liquid crystal displays (LCDs), and more particularly to an LCD device and a light emitting diode (LED) backlight driving circuit.

BACKGROUND

A liquid crystal display (LCD) device includes a liquid crystal display (LCD) panel and a backlight unit. Generally, a typical backlight unit uses a light emitting diode (LED) as a backlight source, thus, an LED backlight driving circuit is used to adjust brightness of an LED light bar. The LED backlight driving circuit includes a driving chip. Because temperature of the backlight unit can be excessive, a thermal protection circuit is arranged at an external of the driving chip to avoid damage to the driving chip. As shown in FIG. 1, the thermal protection circuit includes a comparator P, a non-inverting input end of the comparator P receives a constant reference voltage, and an inverting input end of the comparator P is connected to a collector of a BJT Q. Voltage between the collector of the BJT and a gate of the BJT reduces at high temperatures, and when the voltage is less than the constant reference voltage, the comparator P outputs an over-temperature protection signal OTP to the driving chip 10 to turn off the LED light bar, which allows for thermal protection of the driving chip. A typical thermal protection circuit is not flexible, and has small application range.

SUMMARY

In view of the above-described problems, the aim of the present disclosure is to provide a light emitting diode (LED) backlight driving circuit and a liquid crystal display (LCD) device capable of being flexibly used and good universality.

The aim of the present disclosure is achieved by the following methods.

A light emitting diode (LED) backlight driving circuit comprises an LED light bar, a voltage conversion unit that drives the LED light bar to light, and a driving chip that controls the voltage conversion unit. The driving chip comprises a temperature collecting unit that uses a thermistor, an adjusting device coupled to the temperature collecting unit, and a voltage protection unit coupled to an output end of the voltage conversion unit. When temperature of the thermistor exceeds a preset threshold, the thermistor controls the temperature collecting unit to output a protection signal, and the adjusting device controls the voltage conversion unit to output a driving voltage that exceeds an over-voltage protection threshold of the LED backlight driving circuit according to the output protection signal, and the voltage protection unit starts an over-voltage protection function.

Furthermore, the temperature collecting unit comprises a voltage-dividing unit having the thermistor, and a comparator coupled to the voltage-dividing unit. When the temperature of the thermistor exceeds the preset threshold, the thermistor controls the voltage-dividing unit to output a corresponding protection voltage to the comparator, and the comparator outputs the protection signal to the adjusting device. The present disclosure uses voltage-dividing resistor to transform temperature change into voltage change, which is beneficial to the circuit to detect the voltage.

Furthermore, the voltage-dividing unit comprises a first resistor, where a first end of the first resistor receives a first reference voltage, and a second end of the first resistor is coupled to the thermistor and a first input end of the comparator. A first end of the thermistor is connected in series with the first resistor, and a second end of the thermistor is coupled to a ground terminal of the LED backlight driving circuit. A second input end of the comparator receives a second reference voltage.

Furthermore, the adjusting device comprises a resistor unit coupled to the temperature collecting unit and a controlling unit coupled to the resistor unit, resistance value of the resistor unit is adjustable, and the controlling unit is used to control the voltage conversion unit. When the temperature of the thermistor exceeds the preset threshold, the temperature collecting unit outputs the protection signal. Resistance value of the resistor unit is dependent on the temperature of the thermistor. The controlling unit controls the voltage conversion unit to output the driving voltage, where the driving voltage exceeds the over-voltage protection threshold of the LED backlight driving circuit. When an output voltage of the voltage conversion unit is constant, the resistor unit can flexibly adjust an output voltage of the resistor unit, which is good for the controlling unit to detect temperature data.

Furthermore, the resistor unit comprises a second resistor and a third resistor, where the second resistor and the third resistor are connected in series between the output end of the voltage conversion unit and a ground terminal of the LED backlight driving circuit. A fourth resistor is connected in parallel with two ends of the third resistor, and the fourth resistor is connected in series with a controllable switch. A control end of the controllable switch is coupled to the temperature collecting unit. This is a specific resistor unit, the controllable switch controls the fourth resistor to be connected or not be connected to the LED backlight driving circuit, which allows the resistance value of the resistor unit to be adjustable. The controllable switch may use a controllable semiconductor device, such as a metal-oxide-semiconductor field-effect transistor (MOSFET).

Furthermore, the controlling unit comprises an operational amplifier, and a frequency-duty-cycle adjusting unit coupled to the operational amplifier. A first input end of the operational amplifier is connected between the second resistor and the third resistor, and a second input end of the operational amplifier receives a third reference voltage. When the controllable switch turns on, the voltage of the first input end of the operational amplifier reduces. The frequency-duty-cycle adjusting unit increases an output voltage of the voltage conversion unit through adjusting any one or two of frequency and duty cycles of the frequency-duty-cycle adjusting unit, which allows the voltage conversion unit to output the driving voltage, where the driving voltage exceeds the over-voltage protection threshold of the LED backlight driving circuit. This is a method for adjusting the output voltage of the voltage conversion unit through using the frequency and the duty cycles of the frequency-duty-cycle adjusting unit.

Furthermore, a fifth resistor and a sixth resistor are connected in series between the output end of the voltage conversion unit and a ground terminal of the LED backlight driving circuit, and the voltage protection unit is connected between the fifth resistor and the sixth resistor. The voltage-resistor is used to collect the output voltage of the voltage conversion unit, which is benefit to the voltage protection unit to collect the voltage.

Furthermore, the voltage conversion unit turns off after the voltage protection unit starts the over-voltage protection function. After the voltage conversion unit turns off, an entire LED lightbar is off, thus heat of the LED backlight driving circuit is not generated, thereby improving cooling speed.

Furthermore, the temperature collecting unit comprises a voltage-dividing unit and a comparator coupled to the voltage-dividing unit. The voltage-dividing unit comprises a first resistor, a first end of the first resistor receives a first reference voltage, and a second end of the first resistor is coupled to a thermistor having a positive temperature coefficient and the second end of the first resistor is coupled to a first input end of the comparator. A first end of the thermistor is connected in series with the first resistor, and a second end of the thermistor is coupled to a ground terminal of the LED backlight driving circuit. A second input end of the comparator receives second reference voltage.

The adjusting device comprises a resistor unit coupled to the temperature collecting unit and a controlling unit coupled to the resistor unit, resistance value of the resistor unit is adjustable, and the controlling unit is used to control the voltage conversion unit.

The resistor unit comprises a second resistor and a third resistor, where the second resistor and the third resistor are connected in series between the output end of the voltage conversion unit and a ground terminal of the LED backlight driving circuit. A fourth resistor is in parallel connected with two ends of the third resistor, and the fourth resistor is connected in series with a controllable switch coupled to an output end of the comparator.

The controlling unit comprises an operational amplifier, and a frequency-duty-cycle adjusting unit coupled to the operational amplifier. A first input end of the operational amplifier is connected between the second resistor and the third resistor, and a second input end of the operational amplifier receives a third reference voltage.

A fifth resistor and a sixth resistor are also connected in series between the output end of the voltage conversion unit and the ground terminal of the LED backlight driving circuit, and the voltage protection unit is connected between the fifth resistor and the sixth resistor.

When the temperature of the thermistor exceeds the preset threshold, resistance value of the thermistor reduces, and a relationship between end voltage of the thermistor and the second reference voltage inverts, which triggers the comparator to output the protection signal. The controllable switch turns on when the controllable switch receives the output protection signal, the fourth resistor is connected in parallel with the third resistor. Voltage of the first input end of the operational amplifier reduces, the frequency-duty-cycle adjusting unit detects change of the voltage of the output end of the operational amplifier, and the frequency-duty-cycle adjusting unit increases an output voltage of the voltage conversion unit through adjusting any one or two of frequency and duty cycles of the frequency-duty-cycle adjusting unit, which allows voltage of the sixth resistor to exceed the over-voltage protection threshold of the LED backlight driving circuit. The voltage conversion unit turns off after the voltage protection unit starts the over-voltage protection function.

A liquid crystal display (LCD) device comprises the LED backlight driving circuit of the present disclosure.

It should be understood that, when a threshold temperature of the BJT is high, such as about 150° C., resistance value between a collector of a BJT and a gate of the BJT triggers thermal protection, which increases design difficulty of the LED backlight driving circuit, and has limited useful range and poor universality. The threshold temperature of the BJT is high, and temperature-resistance value of many components of the LCD device is less than the threshold temperature of the BJT, thus, many components of the LCD device may be damaged before thermal protection can happen. Spontaneous combustion can cause fire disaster, and further endangers personal and property safety.

The present disclosure provides the temperature collecting unit that uses the thermistor, and resistance value of the thermistor is dependent on the temperature of the thermistor, namely change of the resistance value of the thermistor is according to change of the temperature of the thermistor. Changed range of the resistance value of the thermistor is far greater than changed range of the resistance value of between the collector of the BJT and the gate of the BJT, thus, the present disclosure can select the resistance value of the thermistor according to requirements of different panels, which simplifies design and allows the design to have greater application range. Additionally, the threshold of the temperature can be reduced because of use the thermistor, which avoids other components from being damaged because of high temperature, thereby improving safety and reliability. Moreover, the present disclosure provides the driving chip comprising the voltage protection unit to obtain the thermal protection, which simplifies the circuit of thermal protection, provides good and flexible design for designers, and decreases costs.

DETAILED DESCRIPTION

Figure 3:
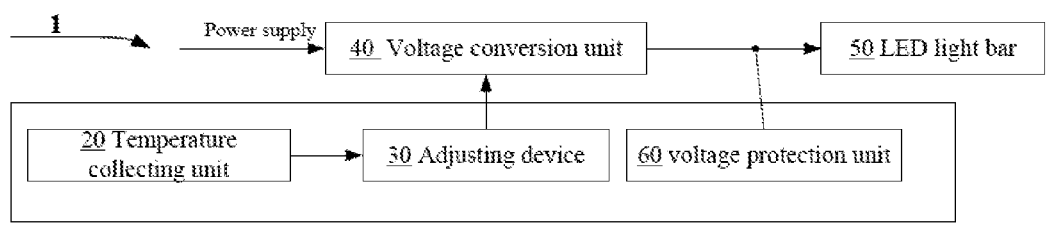
FIG. 3 is a schematic diagram of a light emitting diode (LED) backlight driving circuit of the present disclosure.

As shown in FIG. 3, the present disclosure provides a liquid crystal display (LCD) device comprising a light emitting diode (LED) backlight driving circuit 1. The LED backlight driving circuit 1 comprises an LED light bar 50, a voltage conversion unit 40 that drives the LED light bar 50 to light, and a driving chip 10 that controls the voltage conversion unit 40. The driving chip 10 comprises a temperature collecting unit 20 that uses a thermistor, an adjusting device 30 coupled to the temperature collecting unit 20, and a voltage protection unit 60 coupled to an output end of the voltage conversion unit 40.

When temperature of the thermistor exceeds a preset threshold, the thermistor controls the temperature collecting unit 20 to output a protection signal and the adjusting device 30 controls the voltage conversion unit 40 to output a driving voltage that exceeds an over-voltage protection threshold of the LED backlight driving circuit according to the output protection signal, and the voltage protection unit 60 starts an over-voltage protection function.

Figure 1:
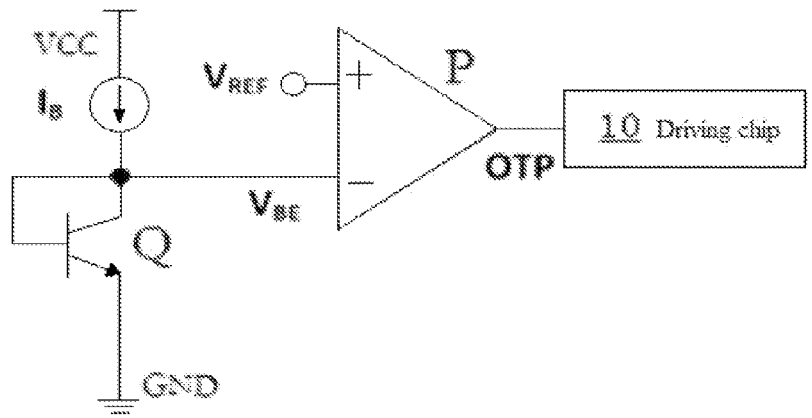
FIG. 1 is a schematic diagram of a typical thermal protection circuit.
Figure 2:
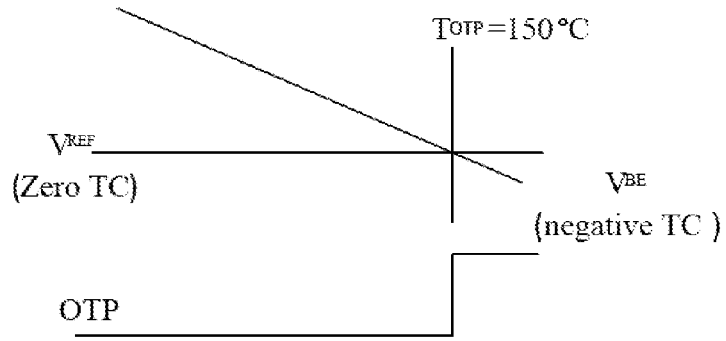
FIG. 2 is a curve diagram of temperature and voltage of a typical thermal protection circuit using a BJT.

It should be understood that, as shown in FIG. 2, when a threshold temperature of the BJT is high, such as about 150° C., resistance value between a collector of a BJT and a gate of the BJT triggers thermal protection, which increases design difficulty of the LED backlight driving circuit, and has limited useful range and poor universality. The threshold temperature of the BJT is high, and temperature-resistance value of many components of the LCD device is less than the threshold temperature of the BJT, thus, the many components of the LCD device may be damaged before thermal protection can happen. Spontaneous combustion can cause fire disaster and further endangers personal and property safety.

The present disclosure provides the temperature collecting unit that uses the thermistor, and resistance value of the thermistor is dependent on the temperature of the thermistor, namely change of the resistance value of the thermistor is according to change of the temperature of the thermistor. Furthermore, changed range of the resistance value of the thermistor is far greater than changed range of the resistance value of between the collector of the BJT and the gate of the BJT, thus, the present disclosure can select the resistance value of the thermistor according to requirements of different panels, which simplifies design and allows the design to have greater application range. Additionally, the threshold of the temperature can be reduced because of use the thermistor, which avoids other components from being damaged because of high temperature, thereby improving safety and reliability. Moreover, the present disclosure provides the driving chip comprising the voltage protection unit to obtain the thermal protection, which simplifies the circuit of thermal protection, provides good and flexible design for designers, and decreases costs.

The present disclosure will further be described in detail in accordance with the figures and the exemplary examples.

Figure 4:
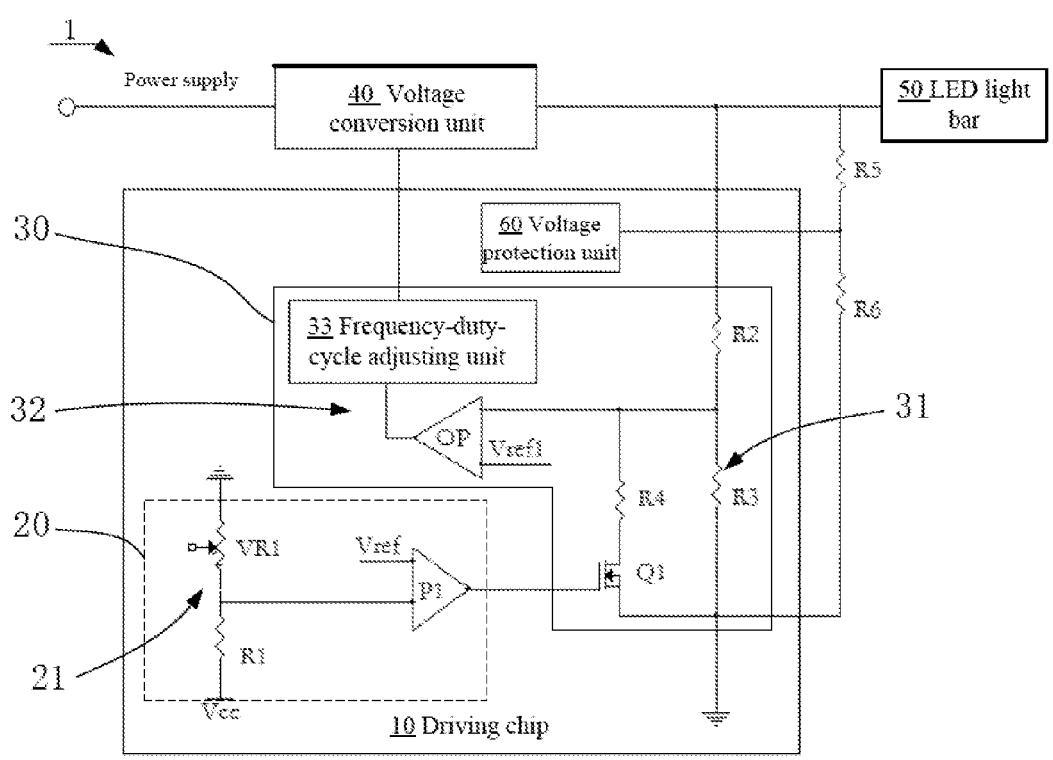
FIG. 4 is a schematic diagram of an LED backlight driving circuit of an example of the present disclosure.

As shown in FIG. 4, the LED backlight driving circuit 1 comprises the LED light bar 50, the voltage conversion unit 40 that drives the LED light bar 50 to light, and the driving chip 10 that controls the voltage conversion unit 40. The driving chip 10 comprises the temperature collecting unit 20 that uses the thermistor, the adjusting device 30 coupled to the temperature collecting unit 20, and the voltage protection unit 60 coupled to the output end of the voltage conversion unit 40.

The temperature collecting unit 20 comprises a voltage-dividing unit 21, and a comparator P1 coupled to the voltage-dividing unit 21. The voltage-dividing unit 21 comprises a first resistor R1, where a first end of the first resistor R1 receives a first reference voltage VCC, and a second end of the first resistor R1 is coupled to a first end of the thermistor VR1 having a positive temperature coefficient and the second end of the first resistor R1 is coupled to a first input end of the comparator P1. The first end of the thermistor VR1 is connected in series with the first resistor R1, and a second end of the thermistor VR1 is coupled to a ground terminal of the LED backlight driving circuit 1. A second input end of the comparator P1 receives a second reference voltage Vref. When an output voltage of the voltage conversion unit 40 is constant, a resistor unit 31 can flexibly adjust an output voltage of the resistor unit 31, which is good for a controlling unit 32 to detect temperature data.

The adjusting device 30 comprises the resistor unit 31 coupled to the temperature collecting unit 20 and the controlling unit 32 coupled to the resistor unit 31, where resistance value of the resistor unit 31 is adjustable, and the controlling unit 32 is used to control the voltage conversion unit 40.

The resistor unit 31 comprises a second resistor R2 and a third resistor R3, where the second resistor R2 and the third resistor R3 are connected in series between the output end of the voltage conversion unit 40 and the ground terminal of the LED backlight driving circuit. A fourth resistor R4 is connected in parallel with two ends of the third resistor R3, and is connected in series with a controllable switch, where the controllable switch is coupled to an output end of the comparator P1 and the comparator outputs the protection signal to the controllable switch. The controllable switch is used to control the fourth resistor to be connected or not be connected to the LED backlight driving circuit, which allows the resistance value of the resistor unit 31 to be adjustable. The controllable switch may use a controllable semiconductor device, such as a metal-oxide-semiconductor field-effect transistor (MOSFET).

The controlling unit 32 comprises an operational amplifier OP, and a frequency-duty-cycle adjusting unit 33 coupled to the operational amplifier OP. A first input end of the operational amplifier is connected between the second resistor R2 and the third resistor R3, and a second input end of the operational amplifier receives a third reference voltage Vref1.

A fifth resistor R5 and a sixth resistor R6 are also connected in series between the output end of the voltage conversion unit 40 and the ground terminal of the LED backlight driving circuit, and the voltage protection unit 60 is connected between the fifth resistor R5 and the sixth resistor R6. The present disclosure uses a voltage-dividing resistor to detect voltage of the output end of the voltage conversion unit 40, which is beneficial to the voltage protection unit 60 to detect the voltage.

When temperature of the thermistor exceeds the preset threshold, the resistance value of the thermistor reduces, thus, a relationship between an end voltage of the thermistor VR1 and the second reference voltage Vref inverts, which triggers the comparator P1 to output a protection signal. The controllable switch turns on when the controllable switch receives the output protection signal, the fourth resistor R4 is connected in the LED backlight driving circuit, and is connected in parallel with the third resistor R3. Thus, the voltage of the first input end of the operational amplifier reduces, the frequency-duty-cycle adjusting unit 33 detects change of the voltage of the output end of the operational amplifier, and the frequency-duty-cycle adjusting unit 33 increases an output voltage of the voltage conversion unit 40 through adjusting any one or two of frequency and duty cycles of the frequency-duty-cycle adjusting unit 33, which allows voltage of the sixth resistor R6 to exceed an over-voltage protection threshold of the LED backlight driving circuit 1. The voltage conversion unit 40 turns off after the voltage protection unit 60 starts the over-voltage protection function.

The present disclosure provides the thermistor VR1 having a constant value of the positive temperature coefficient (e.g. the resistance value of the thermistor VR1 is constant when environmental temperature is 25° C.), when the temperature increases, the resistance value of the thermistor VR1 accordingly increases, thus, the voltage of the first input end of the comparator P1 increases. When the voltage of the first input end of the comparator P1 is greater than the second reference voltage Vref of the second input end of the comparator P1, the output protection signal of the comparator P1 inverts, the controllable switch turns on, and the fourth resistor R4 is connected in parallel with the third resistor R3. Thus, the voltage of the first input end of the operational amplifier reduces, and is compared with the third reference voltage Vref1, where compared result is sent to the frequency-duty-cycle adjusting unit 33. The frequency-duty-cycle adjusting unit 33 adjusts the voltage conversion unit 40 to increase or reduce the output voltage of the voltage conversion unit 40 according the compared result. The fifth resistor R5 and the sixth resistor R6 are used to detect whether the output voltage of the voltage conversion unit 40 reaches over voltage or under voltage protection threshold of the driving chip 10, and the thermal protection is obtained through over voltage or under voltage protection function of the voltage protection unit 60.

For example, the voltage of the first resistor R1 is regarded as a, when the temperature of the thermal protection corresponding to the thermistor VR1 is regarded as 70° C., the voltage of the thermistor VR1 is regarded as b (the voltage of the thermistor VR1 is same as the second reference voltage Vref), the third reference voltage Vref1 is regarded as c. When the temperature of the driving chip 10 increases from the environment temperature 25° C., the resistance value of the thermistor VR1 increases, and the voltage of the thermistor VR1 accordingly increases. When the temperature of the driving chip increases to 70° C. from the environment temperature 25° C., the voltage of the thermistor VR1 increases b from a. When the temperature of the driving chip continually increases, the voltage of the thermistor VR1 accordingly continually increases, thus, the voltage of the thermistor VR1 is more than b, which allows the output protection signal of the comparator P1 to invert. After the output protection signal of the comparator P1 inverts, the controllable switch turns on, the fourth resistor R4 is connected in parallel with the third resistor R3, which affects the voltage of the first input end of the operational amplifier, and makes the voltage of the first input end of the operational amplifier be less than c. the voltage of the first input end of the operational amplifier compares with c, the compared result is sent to the frequency-duty-cycle adjusting unit to control an increase of the output voltage of the voltage conversion unit 40, thus, the voltages of the fifth resistor R5 and the sixth resistor R6 increase, moreover, increased voltage is sent to the voltage protection unit 60 to be used for over voltage or under voltage protection, which obtains the thermal protection by using a typical voltage protection function of the driving chip 10. If the resistance value of the first resistor R1 selected is different, the temperature protected for the thermal protection is different, and protection theory is same. Thus, the present disclosure is good at setting the threshold of the thermal protection.

The present disclosure is described in detail in accordance with the above exemplary examples. However, this present disclosure is not limited to the exemplary examples. On the premise of keeping the conception and the scope of the present disclosure, all modifications, equivalent replacements and improvements, etc. should be considered to belong to the protection scope of the present disclosure.

I claim:

1. A light emitting diode (LED) backlight driving circuit, comprising:
    an LED light bar;
    a voltage conversion unit that drives the LED light bar to light; and
    a driving chip that controls the voltage conversion unit;
    wherein the driving chip comprises a temperature collecting unit that uses a thermistor contained in the temperature collecting unit, an adjusting device coupled to the temperature collecting unit, and a voltage protection unit coupled to an output end of the voltage conversion unit;
    when temperature of the thermistor exceeds a preset threshold, the temperature collecting unit outputs a protection signal according to a variation of voltage of the thermistor and the adjusting device controls the voltage conversion unit to output a driving voltage that exceeds an over-voltage protection threshold of the LED backlight driving circuit according to the output protection signal, and the voltage protection unit starts an over-voltage protection function.

2. The LED backlight driving circuit of claim 1, wherein the temperature collecting unit comprises a voltage-dividing unit having the thermistor, and a comparator coupled to the voltage-dividing unit;
    when the temperature of the thermistor exceeds the preset threshold, the voltage-dividing unit outputs a corresponding protection voltage to the comparator according to a variation of voltage of the thermistor, and the comparator outputs the protection signal to the adjusting device.

3. The LED backlight driving circuit of claim 2, wherein the voltage-dividing unit comprises a first resistor; a first end of the first resistor receives a first reference voltage, and a second end of the first resistor is coupled to the thermistor and a first input end of the comparator; a first end of the thermistor is connected in series with the first resistor, and a second end of the thermistor is coupled to a ground terminal of the LED backlight driving circuit; a second input end of the comparator receives a second reference voltage.

4. The LED backlight driving circuit of claim 1, wherein the adjusting device comprises a resistor unit coupled to the temperature collecting unit and a controlling unit coupled to the resistor unit, resistance value of the resistor unit is adjustable, and the controlling unit is used to control the voltage conversion unit;
    when the temperature of the thermistor exceeds the preset threshold, the temperature collecting unit outputs the protection signal; resistance value of the resistor unit is dependent on the temperature of the thermistor; the controlling unit controls the voltage conversion unit to output the driving voltage, wherein the driving voltage exceeds the over-voltage protection threshold of the LED backlight driving circuit.

5. The LED backlight driving circuit of claim 4, wherein the resistor unit comprises a second resistor and a third resistor; the second resistor and the third resistor are connected in series between the output end of the voltage conversion unit and a ground terminal of the LED backlight driving circuit; a fourth resistor is connected in parallel with two ends of the third resistor, and the fourth resistor is connected in series with a controllable switch; a control end of the controllable switch is coupled to the temperature collecting unit.

6. The LED backlight driving circuit of claim 5, wherein the controlling unit comprises an operational amplifier, and a frequency-duty-cycle adjusting unit coupled to the operational amplifier; a first input end of the operational amplifier is connected between the second resistor and the third resistor, and a second input end of the operational amplifier receives a third reference voltage;
    when the controllable switch turns on, voltage of the first input end of the operational amplifier reduces; the frequency-duty-cycle adjusting unit increases an output voltage of the voltage conversion unit through adjusting any one or two of frequency and duty cycles of the frequency-duty-cycle adjusting unit, which allows the voltage conversion unit to output the driving voltage, wherein the driving voltage exceeds the over-voltage protection threshold of the LED backlight driving circuit.

7. The LED backlight driving circuit of claim 1, wherein a fifth resistor and a sixth resistor are connected in series between the output end of the voltage conversion unit and a ground terminal of the LED backlight driving circuit, and the voltage protection unit is connected between the fifth resistor and the sixth resistor.

8. The LED backlight driving circuit of claim 1, wherein the voltage conversion unit turns off after the voltage protection unit starts the over-voltage protection function.

9. The LED backlight driving circuit of claim 1, wherein the temperature collecting unit comprises a voltage-dividing unit and a comparator coupled to the voltage-dividing unit; the voltage-dividing unit comprises a first resistor, a first end of the first resistor receives a first reference voltage, and a second end of the first resistor is coupled to a thermistor having a positive temperature coefficient and the second end of the first resistor is coupled to a first input end of the comparator; a first end of the thermistor is connected in series with the first resistor, and a second end of the thermistor is coupled to a ground terminal of the LED backlight driving circuit; a second input end of the comparator receives a second reference voltage;

the adjusting device comprises a resistor unit coupled to the temperature collecting unit and a controlling unit coupled to the resistor unit, resistance value of the resistor unit is adjustable, and the controlling unit is used to control the voltage conversion unit;

the resistor unit comprises a second resistor and a third resistor; the second resistor and the third resistor are connected in series between the output end of the voltage conversion unit and the ground terminal of the LED backlight driving circuit; a fourth resistor is connected in parallel with two ends of the third resistor, and the fourth resistor is connected in series with a controllable switch coupled to an output end of the comparator;

the controlling unit comprises an operational amplifier, and a frequency-duty-cycle adjusting unit coupled to the operational amplifier; a first input end of the operational amplifier is connected between the second resistor and the third resistor, and a second input end of the operational amplifier receives a third reference voltage;

a fifth resistor and a sixth resistor are also connected in series between the output end of the voltage conversion unit and the ground terminal of the LED backlight driving circuit, and the voltage protection unit is connected between the fifth resistor and the sixth resistor;

when the temperature of the thermistor exceeds the preset threshold, resistance value of the thermistor reduces, a relationship between an end voltage of the thermistor and the second reference voltage inverts, which triggers the comparator to output the protection signal; the controllable switch turns on when the controllable switch receives the output protection signal, the fourth resistor is connected in parallel with the third resistor; voltage of the first input end of the operational amplifier reduces, the frequency-duty-cycle adjusting unit detects change of the voltage of the output end of the operational amplifier, and the frequency-duty-cycle adjusting unit increases an output voltage of the voltage conversion unit through adjusting any one or two of frequency and duty cycles of the frequency-duty-cycle adjusting unit, which allows voltage of the sixth resistor to exceed the over-voltage protection threshold of the LED backlight driving circuit; the voltage conversion unit turns off after the voltage protection unit starts the over-voltage protection function.

10. A liquid crystal display (LCD) device, comprising:
a light emitting diode (LED) backlight driving circuit;
wherein the LED backlight driving circuit comprises an LED light bar, a voltage conversion unit that drives the LED light bar to light, and a driving chip that controls the voltage conversion unit; the driving chip comprises a temperature collecting unit that uses a thermistor contained in the temperature collecting unit, an adjusting device coupled to the temperature collecting unit, and a voltage protection coupled to an output end of the voltage conversion unit;

when temperature of the thermistor exceeds a preset threshold, the temperature collecting unit outputs a protection signal according to a variation of voltage of the thermistor and the adjusting device controls the voltage conversion unit to output a driving voltage that exceeds an over-voltage protection threshold of the LED backlight driving circuit according to the output protection signal, and the voltage protection unit starts an over-voltage protection function.

11. The LCD device of claim 10, wherein the temperature collecting unit comprises a voltage-dividing unit having the thermistor, and a comparator coupled to the voltage-dividing unit;

when the temperature of the thermistor exceeds the preset threshold, the voltage-dividing unit outputs a corresponding protection voltage to the comparator according to a variation of voltage of the thermistor, and the comparator outputs the protection signal to the adjusting device.

12. The LCD device of claim 11, wherein the voltage-dividing unit comprises a first resistor, a first end of the first resistor receives a first reference voltage, and a second end of the first resistor is coupled to the thermistor and a first input end of the comparator; a first end of the thermistor is connected in series with the first resistor, and a second end of the thermistor is coupled to a ground terminal of the LED backlight driving circuit; a second input end of the comparator receives a second reference voltage.

13. The LCD device of claim 10, wherein the adjusting device comprises a resistor unit coupled to the temperature collecting unit and a controlling unit coupled to the resistor unit, resistance value of the resistor unit is adjustable, and the controlling unit is used to control the voltage conversion unit;

when the temperature of the thermistor exceeds the preset threshold, the temperature collecting unit outputs the protection signal; resistance value of the resistor unit is dependent on the temperature of the thermistor; the controlling unit controls the voltage conversion unit to output the driving voltage, wherein the driving voltage exceeds the over-voltage protection threshold of the LED backlight driving circuit.

14. The LCD device of claim 13, wherein the resistor unit comprises a second resistor and a third resistor; the second resistor and the third resistor are connected in series between the output end of the voltage conversion unit and a ground terminal of the LED backlight driving circuit; a fourth resistor is connected in parallel with two ends of the third resistor, and a fourth resistor is connected in series with a controllable switch; a control end of the controllable switch is coupled to the temperature collecting unit.

15. The LCD device of claim 14, wherein the controlling unit comprises an operational amplifier, and a frequency-duty-cycle adjusting unit coupled to the operational amplifier; a first input end of the operational amplifier is connected between the second resistor and the third resistor, and a second input end of the operational amplifier receives a third reference voltage;

when the controllable switch turns on, the voltage of the first input end of the operational amplifier reduces; the frequency-duty-cycle adjusting unit increases an output voltage of the voltage conversion unit through adjusting any one or two of frequency and duty cycles of the frequency-duty-cycle adjusting unit, which allows the voltage conversion unit to output the driving voltage, wherein the driving voltage exceeds the over-voltage protection threshold of the LED backlight driving circuit.

16. The LCD device of claim 10, wherein a fifth resistor and a sixth resistor are connected in series between the output end of the voltage conversion unit and a ground terminal of the LED backlight driving circuit, and the voltage protection unit is connected between the fifth resistor and the sixth resistor.

17. The LCD device of claim 10, wherein the voltage conversion unit turns off after the voltage protection unit starts the over-voltage protection function.

18. The LCD device of claim 10, wherein the temperature collecting unit comprises a voltage-dividing unit and a comparator coupled to the voltage-dividing unit; the voltage-dividing unit comprises a first end of the first resistor receives a first resistor, a first reference voltage, and a second end of the first resistor is coupled to a thermistor having a positive temperature coefficient and the second end of the first resistor is coupled to a first input end of the comparator; a first end of the thermistor is connected in series with the first resistor, and a second end of the thermistor is coupled to a ground terminal of the LED backlight driving circuit; a second input end of the comparator receives a second reference voltage;

the adjusting device comprises a resistor unit coupled to the temperature collecting unit and a controlling unit coupled to the resistor unit, resistance value of the resistor unit is adjustable, and the controlling unit is used to control the voltage conversion unit;

the resistor unit comprises a second resistor and a third resistor; the second resistor and the third resistor are connected in series between the output end of the voltage conversion unit and the ground terminal of the LED backlight driving circuit; a fourth resistor is connected in parallel with two ends of the third resistor, and the fourth resistor is connected in series with a controllable switch coupled to an output end of the comparator;

the controlling unit comprises an operational amplifier, and a frequency-duty-cycle adjusting unit coupled to the operational amplifier; a first input end of the operational amplifier is connected between the second resistor and the third resistor, and a second input end of the operational amplifier receives a third reference voltage;

a fifth resistor and a sixth resistor are also connected in series between the output end of the voltage conversion unit and the ground terminal of the LED backlight driving circuit, and the voltage protection unit is connected between the fifth resistor and the sixth resistor;

when the temperature of the thermistor exceeds the preset threshold, resistance value of the thermistor reduces, a relationship between an end voltage of the thermistor and the second reference voltage invert, which triggers the comparator to output the protection signal; the controllable switch turns on when the controllable switch receive the output protection signal, the fourth resistor is connected in parallel with the third resistor; voltage of the first input end of the operational amplifier reduces, the frequency-duty-cycle adjusting unit detects change of the voltage of the output end of the operational amplifier, and the frequency-duty-cycle adjusting unit increases an output voltage of the voltage conversion unit through adjusting any one or two of frequency and duty cycles of the frequency-duty-cycle adjusting unit, which allows voltage of the sixth resistor to exceed the over-voltage protection threshold of the LED backlight driving circuit; the voltage conversion unit is off after the voltage protection unit starts the over-voltage protection function.

* * * * *